United States Patent [19]
Halterman et al.

[11] Patent Number: 5,797,270
[45] Date of Patent: Aug. 25, 1998

[54] REJUVENATOR CHILL DEVICE

[76] Inventors: Carl Halterman; Chuck Bonnici; Mike Mangini; Steve Tognoli, all of 1650 Zanker Rd., Ste. 231, San Jose, Calif. 95112-1115

[21] Appl. No.: 837,532

[22] Filed: Apr. 21, 1997

[51] Int. Cl.[6] .................. F25D 17/02; A23C 3/02; A47G 29/00
[52] U.S. Cl. .................. 62/64; 62/373; 99/483; 211/80
[58] Field of Search .................. 62/62, 64, 373, 62/376, 434; 99/483; 312/236, 294; 211/80

[56] References Cited

U.S. PATENT DOCUMENTS

| | | | |
|---|---|---|---|
| 4,062,277 | 12/1977 | Powers | 99/483 |
| 4,269,036 | 5/1981 | Koide et al. | 62/159 |
| 5,146,843 | 9/1992 | Fuller et al. | 99/483 |
| 5,237,835 | 8/1993 | Brochier | 62/376 |
| 5,442,994 | 8/1995 | Parker | 99/468 |
| 5,613,423 | 3/1997 | Polster | 99/330 |

*Primary Examiner*—William Doerrler
*Attorney, Agent, or Firm*—The Kline Law Firm

[57] ABSTRACT

A rejuvenator chill device that tempers (thaws) frozen food products to a state that very nearly approximates fresh. The device includes a sealable chamber that circulates water chilled to 38–40° F. around the subject frozen food product, particularly meat. The device tempers frozen meats in approximately 11–35 minutes.

7 Claims, 10 Drawing Sheets

REJUVENATOR CHILL DEVICE

FIELD OF THE INVENTION

The present invention relates generally to food processing, and more particularly is a device to rejuvenate frozen meat using circulating chilled water.

BACKGROUND OF THE INVENTION

Meat for the restaurant industry must generally be transported frozen, or it will spoil. Unfortunately, even very high quality cuts of meat can toughen or dry out when the restaurant thaws the meat in preparation for service to a customer. Making the meat tough or dry through the thawing process significantly decreases the desirability of the meat to the customer. Therefore great care must be taken by the restaurant in the thawing process.

One of the most common current art methods of preparing frozen meat for cooking and serving is to simply allow the meat to thaw in the open air. This process takes approximately 12-14 hours at room temperature. The drawback of this process is that the prolonged exposure of the meat to the air causes the meat to be dried, at least to some extent.

Exposing frozen meat to temperatures higher than room temperatures will accelerate the thawing process, thus reducing the time of exposure to air, but this process must, again at least to some extent, cook the meat. Since thawing temperatures do not begin to approach optimal temperatures for cooking, the meat is again being prepared under less than ideal conditions.

Another current art method of tempering frozen meat is to simply put the frozen meat in a sink filled with water. While this reduces the thawing time to approximately 5-6 hours, there are again serious drawbacks. Because the water is stagnant, there will be temperature variations from the beginning of the process until the meat is thawed. As the water temperature increases, any bacteria present will reproduce very rapidly. This gives rise to an unsanitary and unhealthy condition.

Another means available for thawing meat is to use a plate (usually made from aluminum) that has been heated by placing it under hot running tap water for several minutes. The heat from the plate is transferred to the meat to thaw the meat. This method requires reheating of the plate and that the meat be turned over to expose both sides of the meat to the heated plate. This method exposes the meat to the air, which subjects the meat to the growth of bacteria and unsanitary conditions. It also causes the meat to dry leading to toughness.

Because of the lengthy times required for the prior art methods of preparing frozen meats, restaurateurs are forced to begin preparing the meat to be served on a given day far before it will be ordered by a customer. Therefore, the restaurateur must make an estimation of how much meat will be required on that day. If his estimate is low, he will be without meat to cook when ordered. If his estimate is too high, he will be forced to throw away thawed meat, or refreeze the meat, thereby greatly reducing its quality.

Accordingly, it is an object of the present invention to provide a means of accelerated tempering of meat.

It is a further object of the present invention to provide a device that will temper meat at a given temperature.

SUMMARY OF THE INVENTION

The present invention is a rejuvenator chill device that tempers (thaws) frozen food products to a state that very nearly approximates fresh. The device includes a sealable chamber that circulates water chilled to 38°–40° F. around the subject frozen food product, particularly meat. The device tempers frozen meats in approximately 11-35 minutes.

An advantage of the present invention is that it greatly reduces the time required to temper frozen foods.

Another advantage of the present invention is that it reduces bacteria growth due to the maintenance of a constant low water temperature.

A still further advantage of the present invention is that it returns frozen meats to a fresh, chilled state.

These and other objects and advantages of the present invention will become apparent to those skilled in the art in view of the description of the best presently known mode of carrying out the invention as described herein and as illustrated in the drawings.

DETAILED DESCRIPTION OF THE INVENTION

Figure 1:
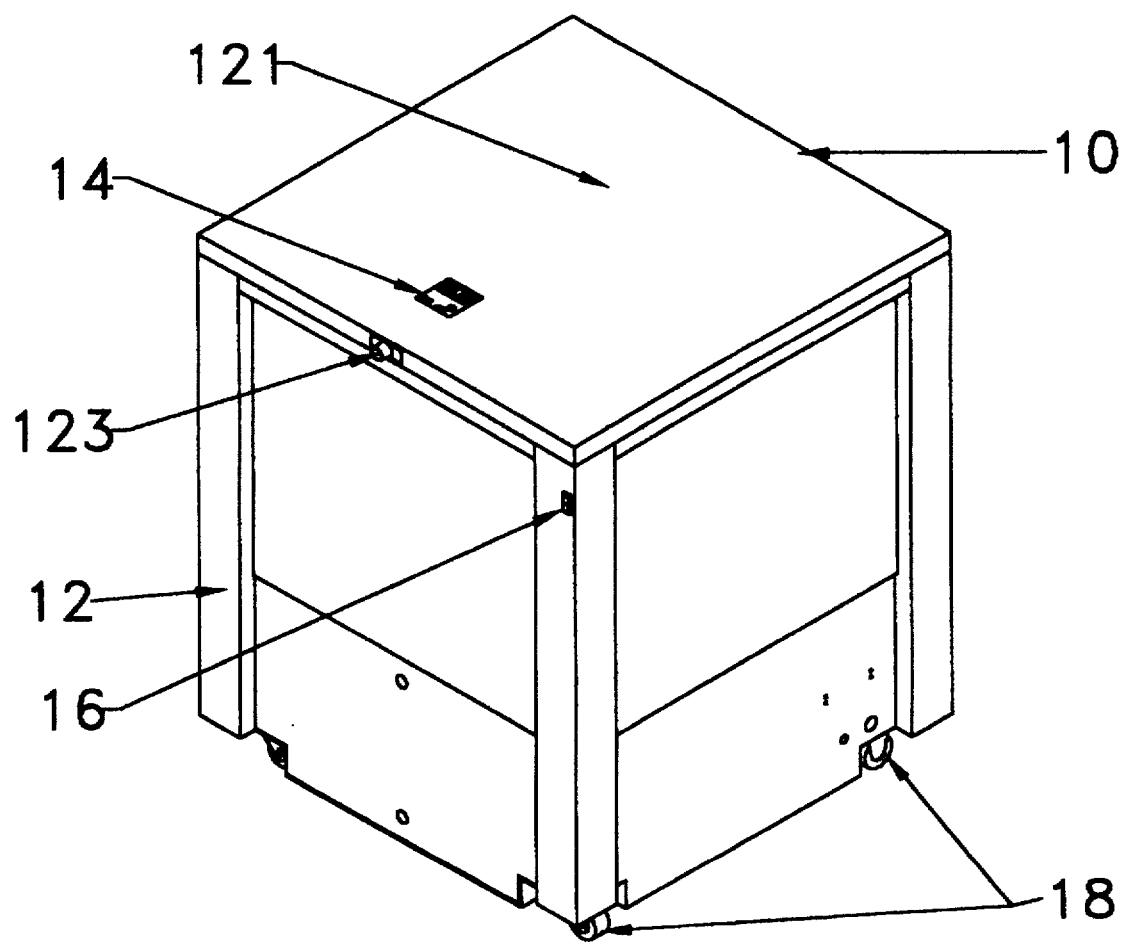
FIG. 1 is a perspective view of the rejuvenator chill device of the present invention.
Figure 2:
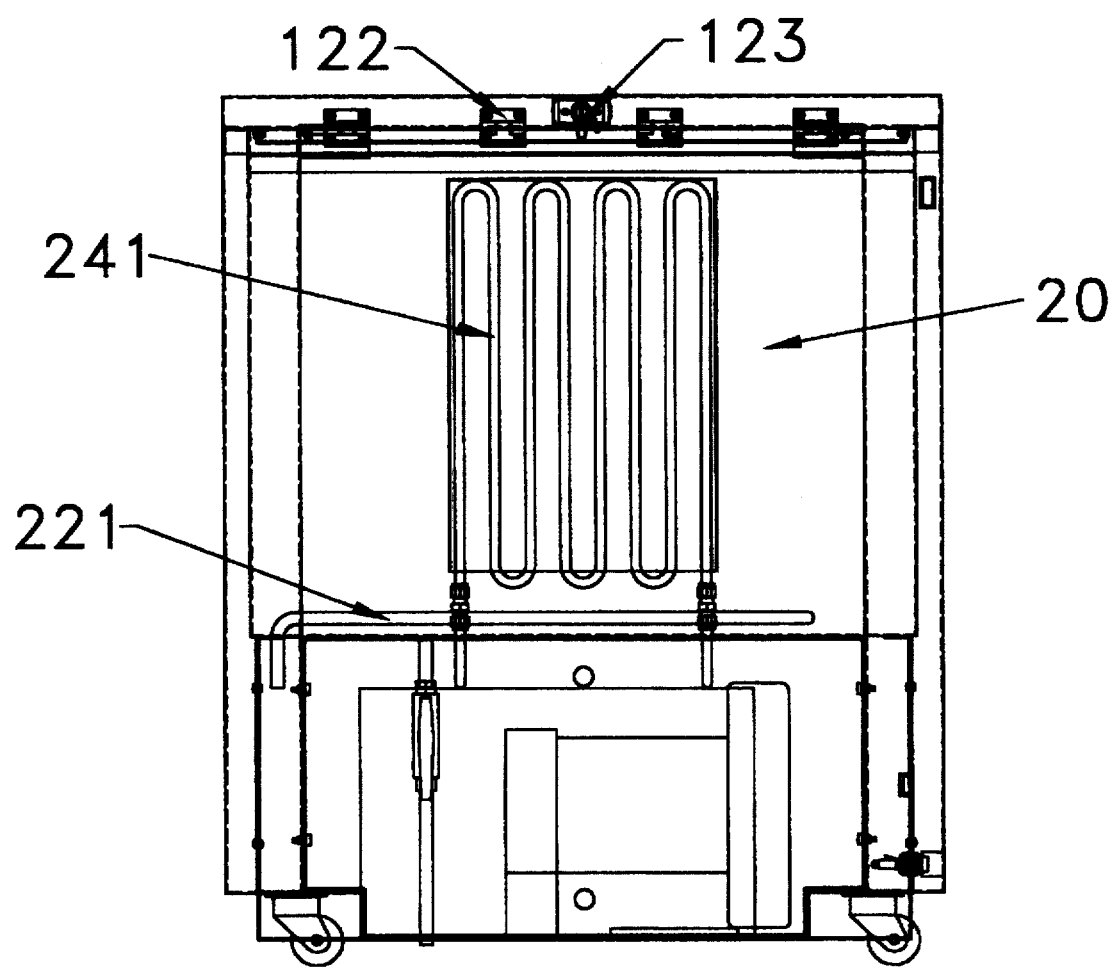
FIG. 2 is a front view of the device with the housing shown in phantom.
Figure 3:
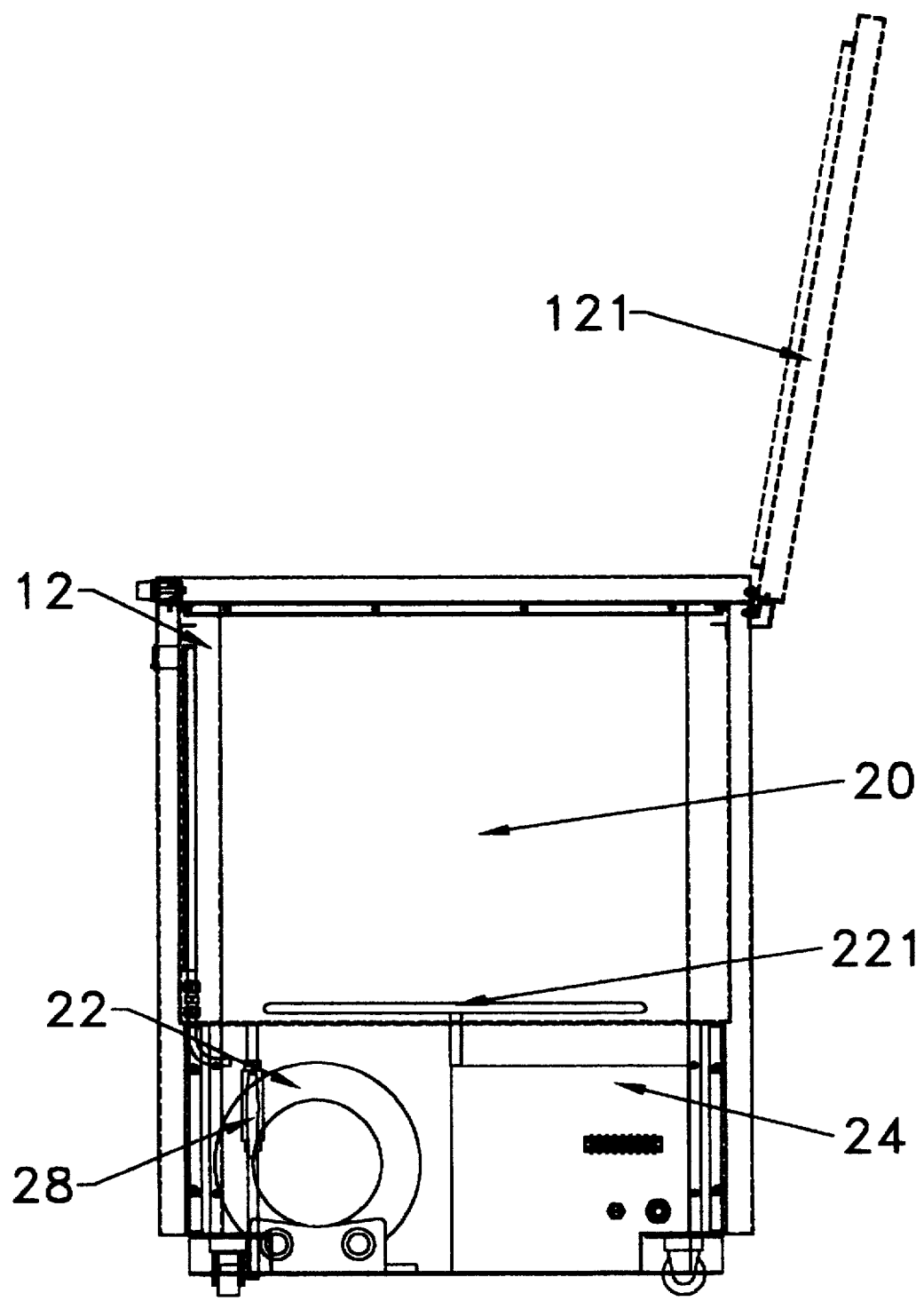
FIG. 3 is a side view of the device with the housing shown in phantom.
Figure 4:
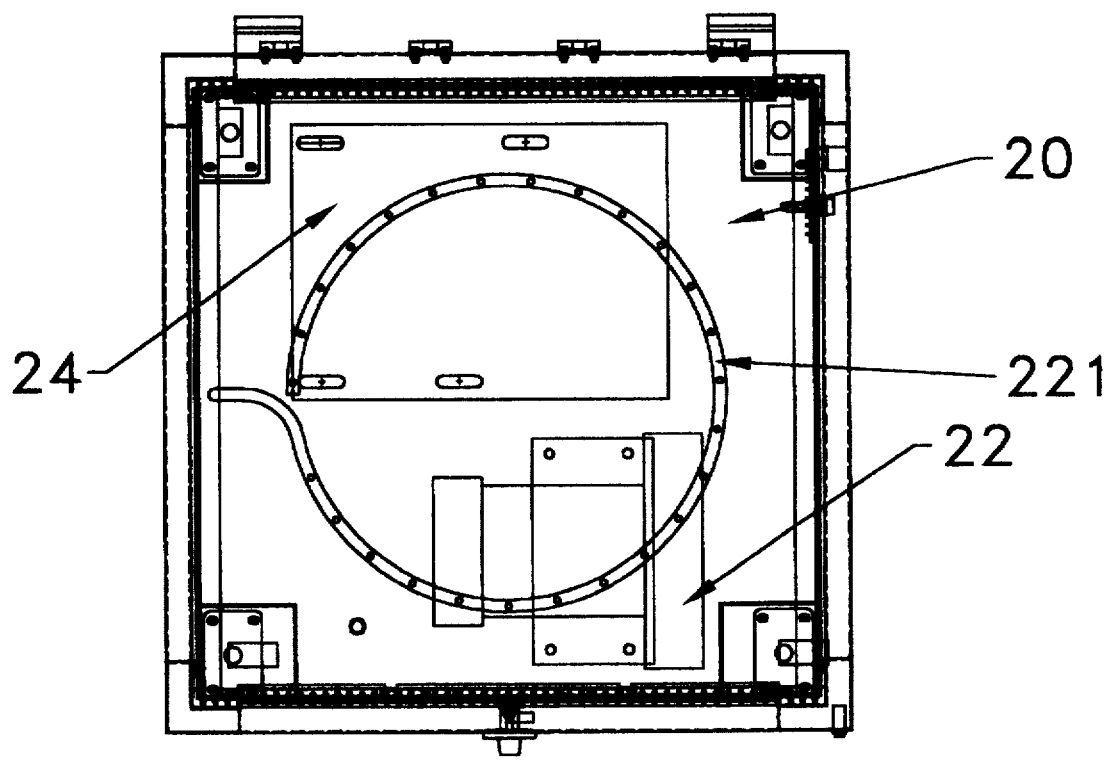
FIG. 4 is a top view of the device with the housing shown in phantom.
Figure 5:
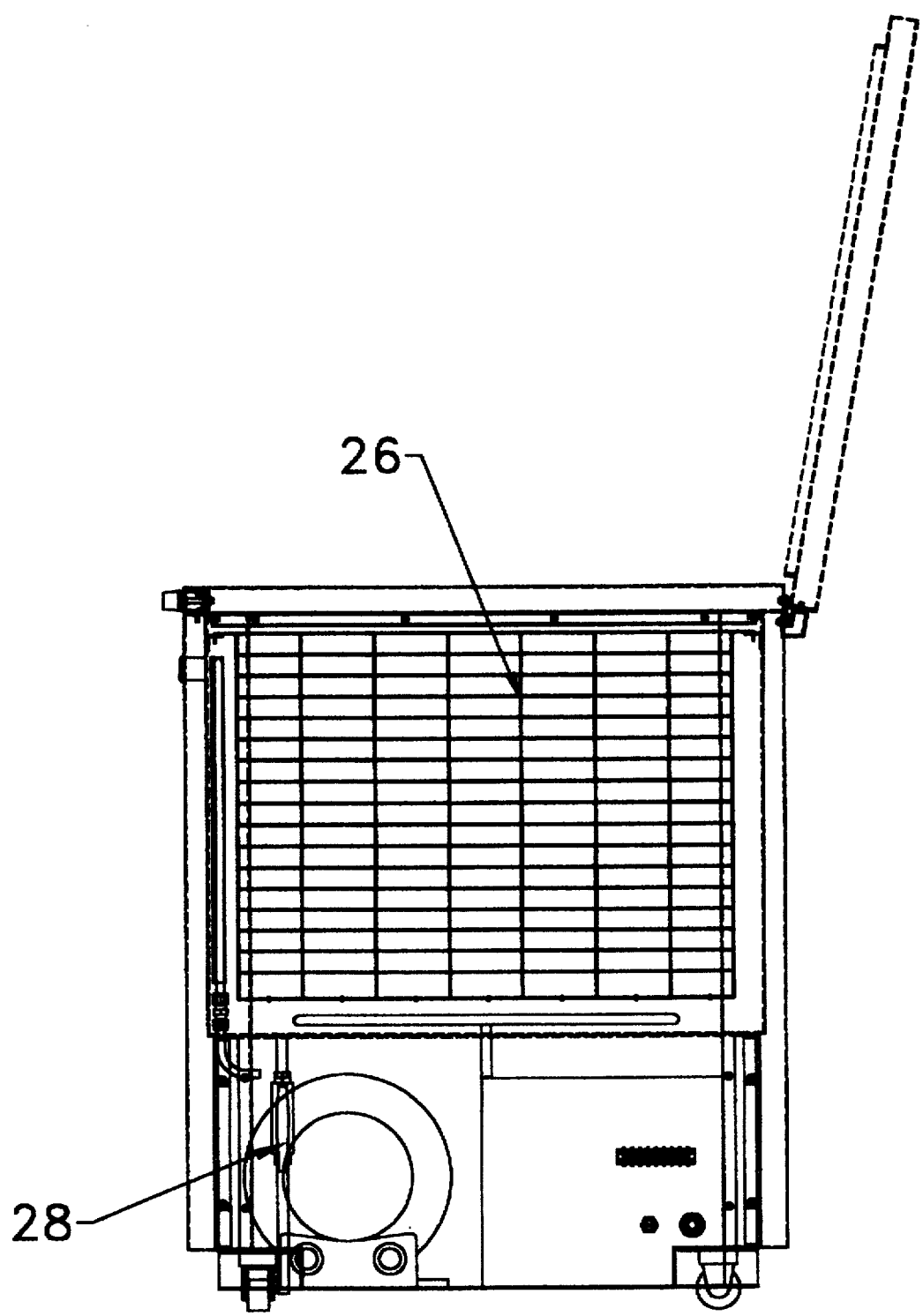
FIG. 5 is a side view of the device with the housing shown in phantom and the air pump removed.
Figure 6:
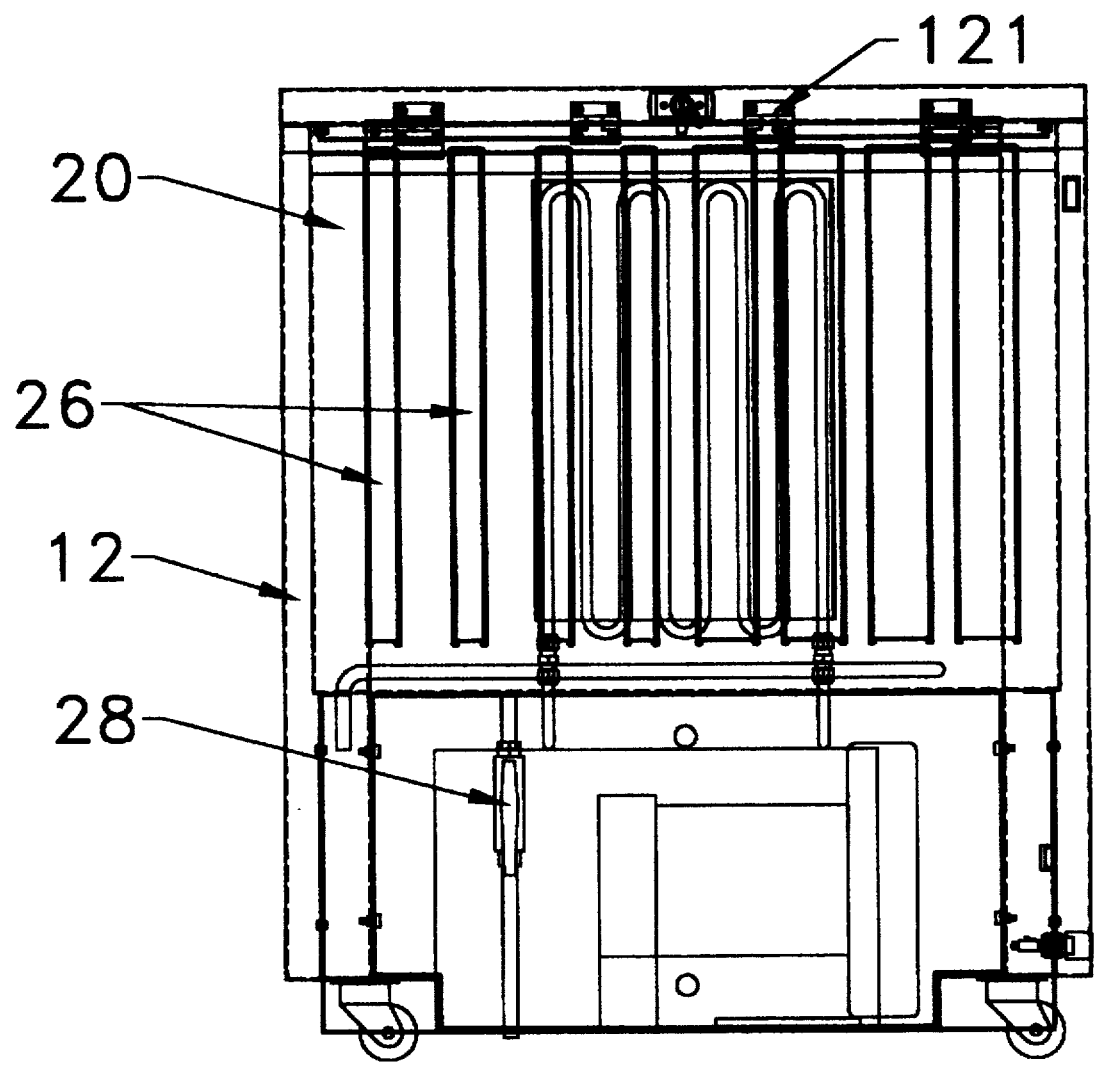
FIG. 6 is a front view of the device with the housing shown in phantom and the air pump removed.
Figure 7:
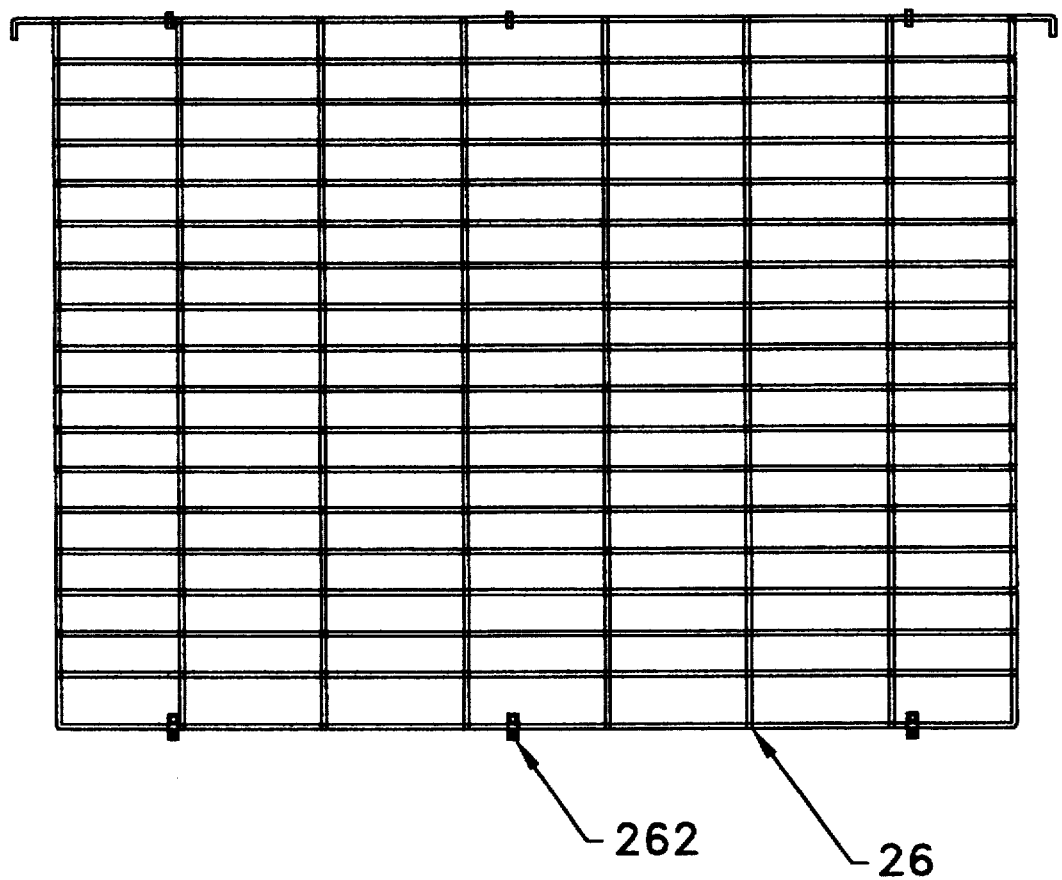
FIG. 7 is a side view of the food rack.
Figure 7A:
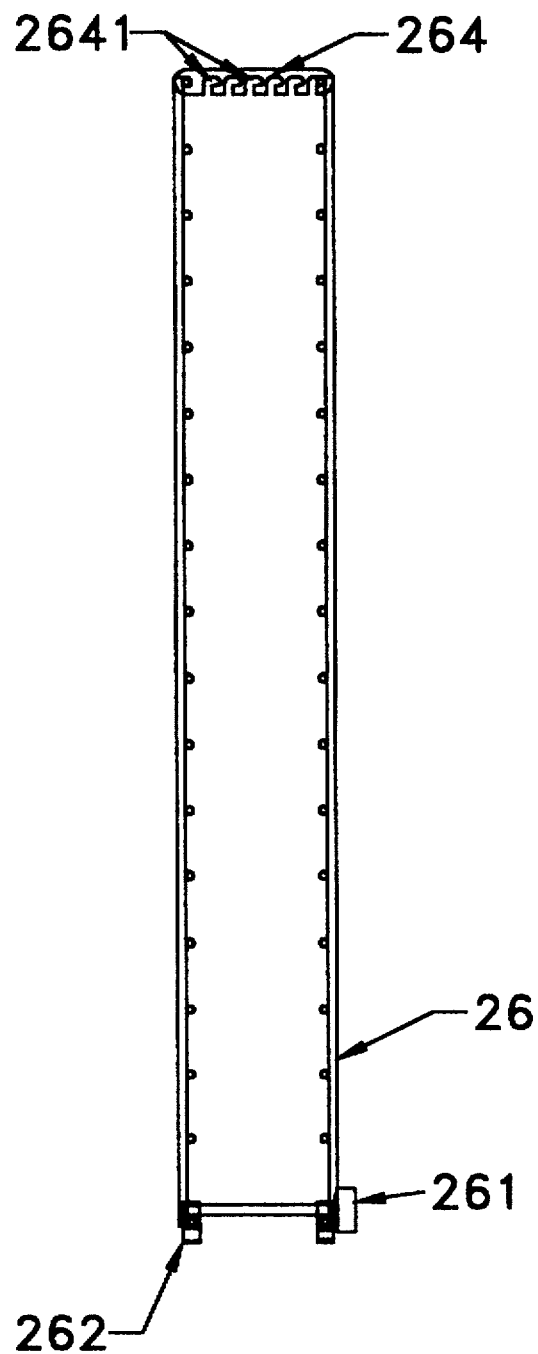
FIG. 7A is an end view of the rack.
Figure 7B:
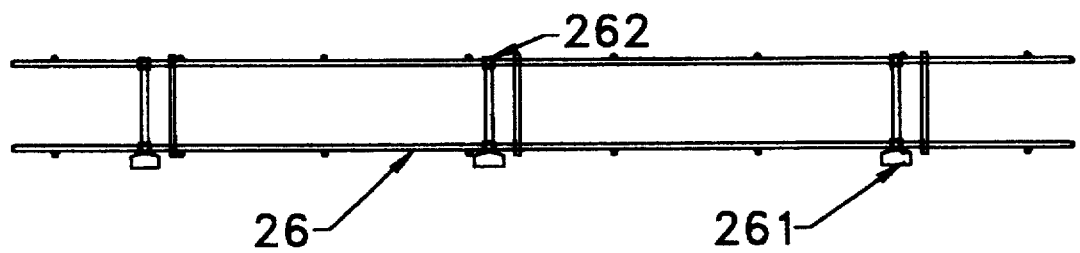
FIG. 7B is a top view of the rack.
Figure 8:
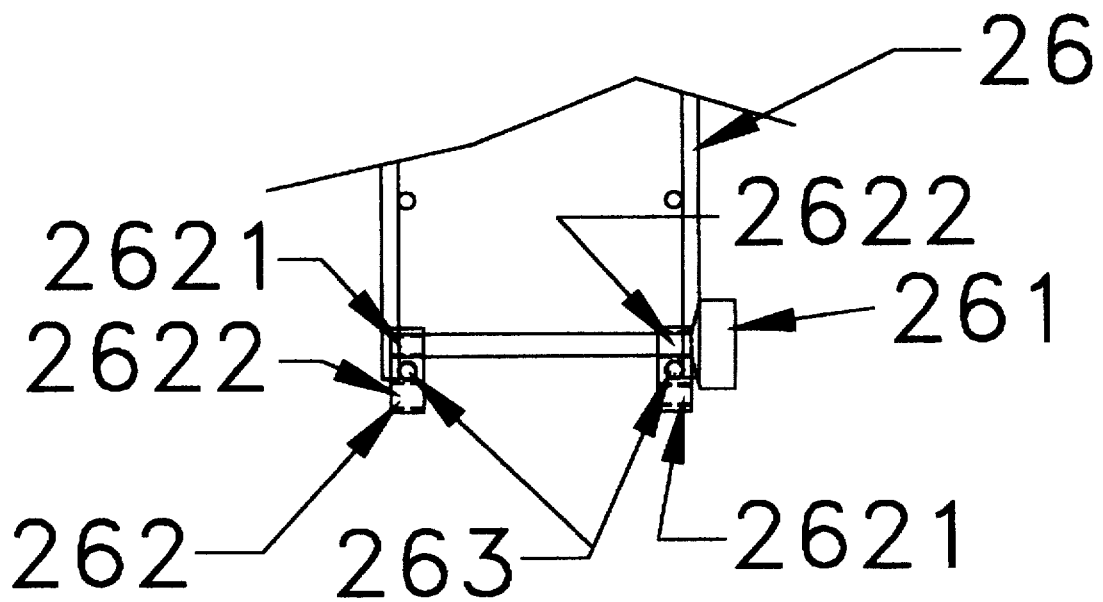
FIG. 8 is a detail view of the rack securing mechanism.

Referring first to FIG. 1, the present invention is a rejuvenator chill device 10. The device 10 includes an outer housing 12 with a timer 14 and an on/off switch 16. The housing 12 is mounted on wheels 18 to lend easy portability to the device.

A lid 121 is mounted to the housing 12 on hinges 122 and is secured with a latching mechanism 123. When in the closed position, the lid 121 creates a watertight seal with the main body of the housing 12.

Referring now to FIGS. 2–6, the rejuvenator chill device 10 comprises a sealable circulation chamber 20. Situated beneath the circulation chamber 20 is a water circulation means, an air blower 22, and a cooling means, a refrigeration unit 24. The air blower 22 forces air through an air line 221. The air line 221 includes a series of angled holes, drilled at an approximately 30° angle, that cause the blown air to agitate the water contained in the circulation chamber 20 so that the water circulates about the chamber 20.

The refrigeration unit 24 circulates chilled coolant through cooling elements, coils 241, affixed to the sides of the circulation chamber 20. It is envisioned that in the preferred embodiment, there will be one or two main cooling coils 241.

The food product to be tempered is suspended in the circulation chamber 20 by means of one or more adjustable racks 26, shown in FIGS. 7, 7A, 7B, and 8. The adjustable racks 26 are situated in the circulation chamber 20 so that chilled water completely surrounds the meat being thawed.

The width of the rack 26 can be adjusted from about ½" to 2". A lower end of the rack 26 is infinitely adjustable within this range by means of a plurality of securing means, threaded thumb screws 261, which secure the lower ends of the two sides of the rack 26. The thumb screws 261 each pass through two floating nuts 262. The floating nuts 262 include a threaded hole 2621 and a non-threaded hole 2622 positioned one above the other. The floating nuts 262 are pivotally secured on a transverse rod 263 at a lower end of the rack 26.

Each thumb screw 261 first passes through a non-threaded hole 2622 of the nut 262, and is then secured in the threaded hole 2621. In this way, the lower end of the rack 26 can be adjusted in width according to the thickness of the food item to be thawed.

The two sides of the rack 26 are secured at a top end by means of a securing bar 264 with a plurality of notches 2641. The securing bar 264 is pivotally secured to a first side of the rack 26. A second side of the rack 26 is received in one of the notches 2641 to fix the distance between the sides of the rack 26. The notch 2641 that receives the rack 26 is chosen according to the thickness of the meat to be thawed.

The rack 26 is opened by a user releasing the second side of the rack 26 from the notch 2641 of the securing bar 264. Because the floating nuts 262 pivot about the transverse rod 263, when the securing bar 264 is released, the sides of the rack 26 swing open for easy loading and unloading of the meat.

The circulation chamber 20 is filled with water by hose, bucket, or any other convenient means at the user's disposal. After a thawing cycle is completed, the water is drained from the chamber 20 through a drain valve 28.

Operation of the unit is as follows: a user places the item to be thawed, generally a meat product, in the racks 26. The racks are placed in the circulation chamber 20, which has been filled with cool water. The user closes the lid 121, sealing the circulation chamber 20. The user then sets the timer 14 and activates the on/off switch 16, beginning the thawing cycle.

The air blower 22 is activated, which causes air to be forced through the air line 221, agitating and circulating the water in the circulation chamber 20 so that the water flows around the item(s) to be thawed. As it circulates, the water also flows around the cooling coils 241. The refrigeration unit 24 circulates chilled coolant through the cooling coils 241. As the water flows around the coils 241, it is cooled so that the water temperature in the circulation chamber 20 is maintained at 38°–40° F. The chilled water circulating around the meat ensures that the temperature in the immediate proximity around the meat remains at 38°–40° F., and does not become significantly warmer.

When the chosen thawing time set on the timer 14 expires, the timer 14 activates an alarm (audible, visible, or both) to alert the user that the thawing cycle has been completed. The user then opens the racks 26 and removes the rejuvenated meat.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

We claim:

1. A thawing device comprising:

an outer housing, means to control cycle times and power on/off, a sealable circulation chamber, a water circulation and agitation means to circulate and agitate water in said circulation chamber, a refrigeration unit with means to provide coolant to cooling elements in said circulation chamber, and means to suspend a food product within said circulation chamber; wherein when a thawing cycle of said device is initiated, said water circulation and agitation means causes said water to flow throughout said circulation chamber, said water flows around the food product suspended in said circulation chamber causing the food product to thaw quickly while immersed in said water to eliminate drying of the food product, said water also flows around said cooling elements, so that said cooling elements continually chill said water.

2. The thawing device of claim 1 wherein:

said water is maintained at a temperature of 38°–40° F.

3. The thawing device of claim 1 wherein:

said cooling elements comprise at least one cooling coil.

4. The thawing device of claim 1 wherein:

said water circulation and agitation means comprises an air blower that forces air through an air line, said air line includes a plurality of holes to release said air into said water, thereby agitating said water and causing said water to circulate about said circulation chamber.

5. The thawing device of claim 1 wherein:

said means to suspend a food product within said circulation chamber comprises at least one rack, said rack is adjustable in width to accommodate food products of varying thicknesses.

6. The thawing device of claim 5 wherein:

said rack comprises a first side element and a second side element, said side elements are secured at lower ends of said side elements by a plurality of rack securing means, said rack securing means each comprise an elongate threaded portion and an enlarged restraining portion, floating nuts pivotally affixed to a transverse rod at said lower end of said side elements of said rack, said floating nuts include a threaded hole and a non-threaded hole, said elongate threaded portion of said rack securing means passes through said non-threaded hole of a first one of said securing nuts pivotally affixed on said first side element, said elongate threaded portion is received in said threaded hole of a second one of said securing nuts pivotally affixed on said second side element, a securing bar pivotally affixed to a top end of said second side element, said securing bar includes a plurality of notches, one of said notches encloses and secures a top end of said second side element of said rack is secured in one of said notches, the specific notch being determined by a thickness of the food item to be secured in said rack; such that said rack is opened by removing said top end of said first side element from said notch of said securing bar, thereby allowing said first side element to swing open through an approximately 180° arc, said floating nuts on said second side element acting as hinge elements, said rack being closed on the food item such that outward tension is applied to said first side element when said securing bar is engaged, thereby urging said floating nuts on said first side to abut said enlarged restraining portion of said rack securing means.

7. A rack to suspend a food product within a thawing device comprising:
- a first side element and a second side element, said side elements are secured at lower ends of said side elements by a plurality of rack securing means,
- said rack securing means each comprise an elongate threaded portion and an enlarged restraining portion,
- floating nuts pivotally affixed to a transverse rod at said lower end of said side elements of said rack, said floating nuts include a threaded hole and a non-threaded hole, said elongate threaded portion of said rack securing means passes through said non-threaded hole of a first one of said securing nuts pivotally affixed on said first side element, said elongate threaded portion is received in said threaded hole of a second one of said securing nuts pivotally affixed on said second side element,
- a securing bar pivotally affixed to a top end of said second side element, said securing bar includes a plurality of notches, one of said notches encloses and secures a top end of said second side element of said rack is secured in one of said notches, the specific notch being determined by a thickness of the food item to be secured in said rack; such that
- said rack is opened by removing said top end of said first side element from said notch of said securing bar, thereby allowing said first side element to swing open through an approximately 180° arc, said floating nuts on said second side element acting as hinge elements,
- said rack being closed on the food item such that outward tension is applied to said first side element when said securing bar is engaged, thereby urging said floating nuts on said first side to abut said enlarged restraining portion of said rack securing means.

* * * * *

UNITED STATES PATENT AND TRADEMARK OFFICE
CERTIFICATE OF CORRECTION

PATENT NO. : 5,797,270
DATED : Aug. 25, 1998
INVENTOR(S) : Halterman, et al.

It is certified that error appears in the above-identified patent and that said Letters Patent is hereby corrected as shown below:

On the cover page, item 57, the ABSTRACT, at line 4, please delete "3840°F.", and insert -- 38-40°F --.

Signed and Sealed this

Seventeenth Day of November, 1998

Attest:

BRUCE LEHMAN

*Attesting Officer*  *Commissioner of Patents and Trademarks*